April 25, 1950          H. N. WEBSTER          2,505,631
LOCKING DEVICE FOR PIPE JOINTS
Filed Dec. 31, 1947          2 Sheets-Sheet 1
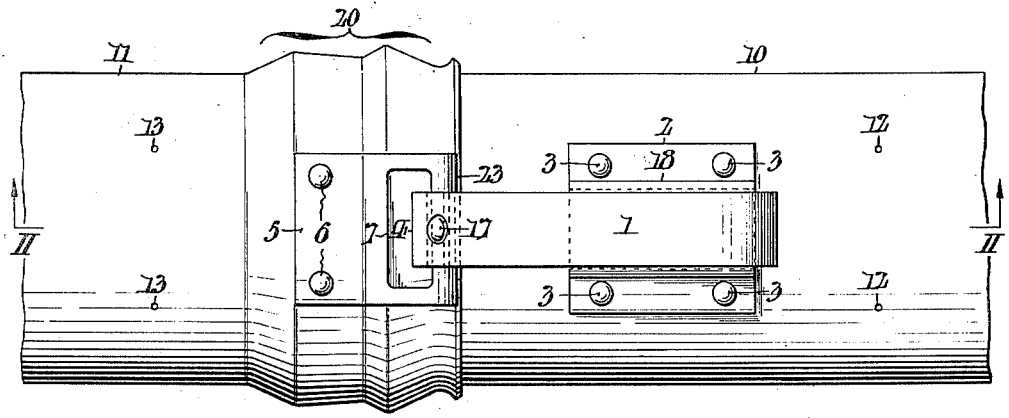
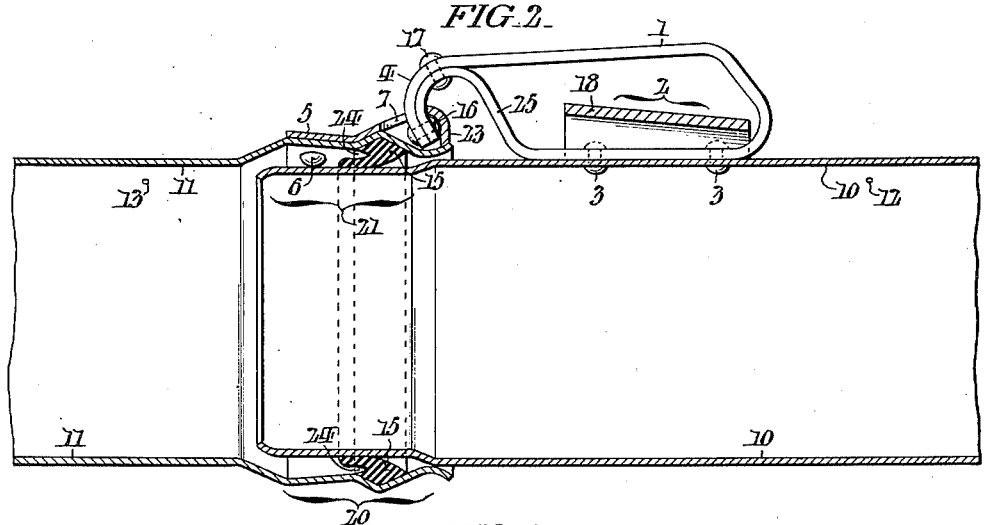
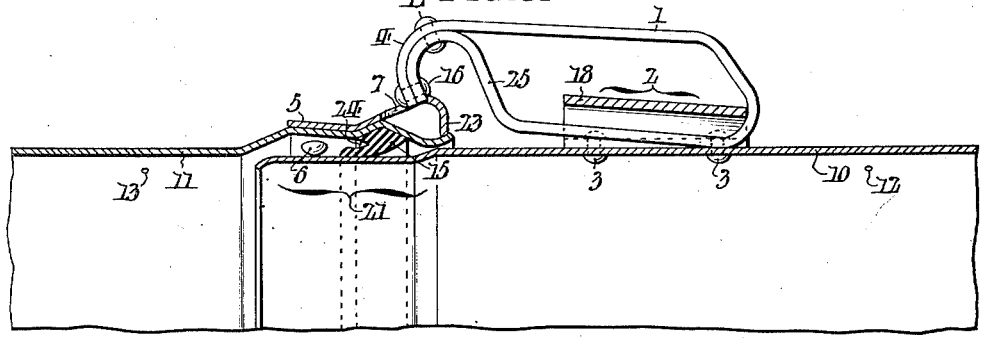
WITNESSES
INVENTOR:
Henry N. Webster,
BY Paul & Paul
ATTORNEYS.

April 25, 1950 H. N. WEBSTER 2,505,631
LOCKING DEVICE FOR PIPE JOINTS
Filed Dec. 31, 1947 2 Sheets-Sheet 2
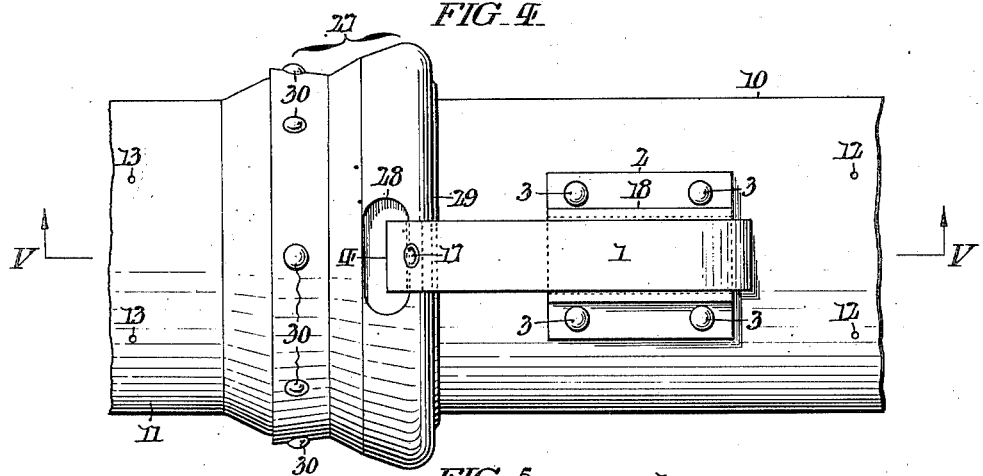
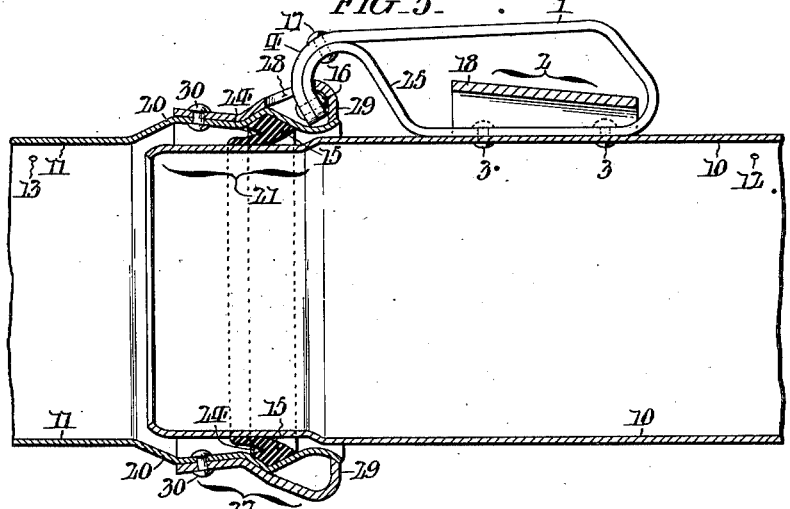
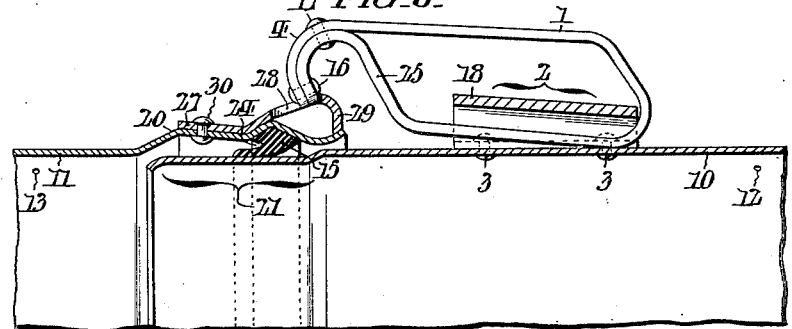
WITNESSES
INVENTOR:
Henry N. Webster,
BY Paul & Paul
ATTORNEYS.

Patented Apr. 25, 1950

2,505,631

UNITED STATES PATENT OFFICE 2,505,631

LOCKING DEVICE FOR PIPE JOINTS

Henry N. Webster, Sebring, Fla., assignor to Webster Corporation, Sebring, Fla., a corporation of Florida Application December 31, 1947, Serial No. 794,950

5 Claims. (Cl. 285—170)

My invention relates generally to a locking device for pipe joints and more particularly to a combination locking device and handle for pipe joints.

The main object of my invention is to provide a rugged and simple combination locking device and handle for portable irrigation pipe sections. Another object of my invention is the provision of a handle and locking device which will insure the proper positioning of the water vents in the top of the sectional irrigation pipe as the pipe sections are locked together. Another object of my invention is the provision of a strong and positively acting locking device which will permit a measure of angular movement between adjacent pipe sections without subjecting the locking device to breakage or strain. Another object of my invention is the provision of a locking device with an operating handle which facilitates locking and unlocking and yet will withstand the internal pressure of water in the pipe line. Still further objects and advantages of my invention become apparent from the following detailed description of preferred and modified forms thereof which are illustrated in the accompanying drawings.

Fig. 1 is a plan view of the preferred form of my invention.

Fig. 2 is a longitudinal section of the device taken as indicated by the arrows II—II in Fig. 1.

Fig. 3 is a partial longitudinal section taken similarly as the section shown in Fig. 2 but showing the locking handle in a raised position as in the process of engagement or disengagement.

Fig. 4 is a plan view of a modified form of my invention.

Fig. 5 is a longitudinal section taken as indicated by the arrows V—V in Fig. 4.

Fig. 6 is a partial longitudinal section taken similarly to the section shown in Fig. 4 but showing the locking handle in a raised position as in process of engagement or disengagement.

In describing the embodiments of this invention shown in the drawings, a specific terminology will be adopted for the purpose of clarity, but it is to be understood that it is not intended thereby to limit the invention to this detailed description of illustrative embodiments thereof. Each term adopted is intended to include all equivalents thereof which operate in a substantially similar manner to accomplish a substantially similar result.

My invention consists generally of a locking and carrying handle 1 slidably mounted in a sleeve 2 which is mounted on pipe section 10 by rivets 3, an engaging hook 4 formed on the locking and carrying handle 1, a receiving clip 5 mounted on pipe section 11 by rivets 6 and having a rectangular opening 7 formed therein to receive the engaging hook 4, and a resilient gasket 15 supported between the telescoping pipe section 10 and 11.

The locking and carrying handle 1, hereinafter referred to as locking handle 1, is desirably formed from an aluminum strip and bent or otherwise formed into the shape of a parallelogram with the two ends brought together and bent into the engaging hook 4. See Fig. 2. Rivets 16 and 17 hold the two ends together as shown and rivet 16 provides a small abutment for aiding in holding the engaging hook 4 in engagement with the receiving clip 5. The portion shaped generally as a parallelogram forms the handle of the device. It will be clear to those skilled in the art that the engaging hook 4 must be sufficiently curved to positively engage the receiving clip 5 and yet permit easy and efficient engagement and disengagement. See Fig. 3 showing a disengaged position. While I have suggested that aluminum be used in view of experience developed in the practice of my invention with aluminum tubing, it will be obvious that other metallic materials may also be used effectively.

The sleeve 2 may be formed from aluminum or like material of sufficient thickness to provide great holding strength and it is firmly mounted in place on the tube 10 by the four rivets 3. If the locking handle 1 has been previously formed as described above, it should be mounted in place before the rivets 3 are driven. It will be noticed from the drawings that top portion 18 of the sleeve 2 has an upward inclination toward the end of the tube 10. This permits free swinging action of the locking handle 1 in the locking and unlocking operation. The sleeve 2 and locking handle 1 are mounted in substantial longitudinal alignment with two parallel longitudinal rows of fluid vents 12 in pipe 10. These vents 12 are spaced longitudinally along the pipe 10 at intervals of about one foot and function as sprinkler orifices directing water to each side of the pipe 10.

The receiving clip 5 may be of the same material as the pipe sections 10 and 11 which is aluminum. The riveted portion of the clip 5 is given a shape to conform with the end portion of pipe section 11 which is expanded to provide the female element 20 of the pipe joint, the end of the pipe section 10 being reduced to provide the male element 21 of the pipe joint. The outer portion of the receiving clip 5 toward the end of the pipe 11 is bent upwardly and terminates in a downwardly projecting lip 23 thereby providing a space between the wall of the pipe section 11 and the receiving clip 5 to accommodate the engaging hook 4. See Fig. 2. The clip 5 is mounted in substantial longitudinal alignment with two parallel longitudinal rows of fluid vents 13 in pipe 11 so that the rows of vents 12 and 13 in pipes 10 and 11 are in longitudinal alignment when the pipe joint is coupled. The gasket 15 positioned between the overlapping portions 20 and 21 of the pipe sections 11 and 10 is of a form which provides for relative angular movement between the pipes 10 and 11 and also provides a fluid-tight joint. The V-shaped annular recess 24 formed in the side of the gasket 15 exposed to the fluid pressure within the pipe sections 10 and 11 utilizes this fluid pressure to force the outer and inner surfaces of the gasket 15 against the walls of the pipes 10 and 11. In this way great flexibility is provided without losing the fluid-tight integrity of the joint.

My invention has been most effective in its application to portable sections of aluminum irrigation piping. The flexibility provided by the pipe joint permits a rough adjustment of the pipe line with the terrain. When the pipe sections are moved about in assembling or disassembling the pipe line, the locking handle greatly facilitates the operation. A light aluminum pipe section may be transported and slid into engagement by using the locking handle 1 and then locked in place by dropping the handle lock 1 into engagement with the receiving clip 5. As the handle lock 1 is used to pull the pipe section 10 toward and into telescopic engagement with the pipe section 11, the engaging hook 4 of the locking handle tends to swing upwardly and away from interference with the clip 5 as is shown in Fig. 3. The upper portion 18 of the sleeve 2 is inclined upwardly to permit this action. When the male element 21 of pipe 10 has been brought into proper engagement with the female element 20 of pipe 11, the engaging hook 4 is then dropped into engagement with the opening 7 of the receiving clip 5. See Fig. 2.

In disengaging, the locking handle 1 may be lifted out of engagement with the receiving clip 5 and then freely moved longitudinally in the sleeve 2 so that the element 25 of the handle lock 1 engages with the sleeve 2 in preparation for pulling the pipe 10 out from engagement with pipe 11. It will be noticed that in this position the engaging hook 4 is completely clear of interfering contact with the end of pipe 11 and the lock handle thereafter serves as a handle and its locking function can be forgotten.

A modified form of my invention is shown in Figs 4-6. In this form, a sleeve 27 is provided for strengthening the end of pipe 11 and opening 28 is provided in sleeve 27 which receives the engagement hook 4 as in the preferred form of my invention. Thus the sleeve 27 takes the place of receiving clip 5 in the preferred form and at the same time adds additional strength. The sleeve 27 has a peripheral terminal lip 29 which is bent downwardly into contact with the pipe wall after the sleeve is positioned around the end of the pipe 11. Rivets 30 hold the sleeve 27 in place. The sleeve 27 is formed to be slid into place over the female end of the pipe section from the male end thereof and rolled to conform to the female end, the bending down of the lip 29 taking place afterwards.

While this invention has been described above in considerable detail and certain modifications thereof suggested, it will be apparent to those skilled in the art that various other changes and modifications may be made without departing from the spirit or scope of the invention as defined in the following claims.

I claim:

1. In combination with a pipe joint, a locking and carrying handle slidably mounted in a sleeve mounted on one pipe of said pipe joint, an engaging hook formed on said locking and carrying handle, and a receiving element mounted on the other pipe of said pipe joint, said receiving element having an opening formed therein to receive said engaging hook formed on said locking and carrying handle.

2. A pipe joint comprising a female pipe end in engagement with a male pipe end with a gasket positioned therebetween, a tapering sleeve mounted on one of said pipe ends with the larger end of the sleeve toward the pipe end, a locking and carrying handle slidably mounted for limited longitudinal movement in said sleeve, an engaging hook formed on said locking and carrying handle, and a receiving clip mounted on the other pipe end, said receiving clip having an opening formed therein to receive said engaging hook.

3. The invention of claim 2 characterized further by the fact that said female and male pipe ends are formed on pipe sections having water vents longitudinally disposed in substantial alignment with said locking and carrying handle and receiving clip whereby the positioning of said pipe joint with the locking and carrying handle on top of the pipe joint will cause said vents to point in a generally upward direction.

4. The invention of claim 2 characterized further by the fact that said gasket has a concave annular opening formed therein on the side responsive to fluid pressure within said pipe joint.

5. The invention of claim 1 characterized further by the fact that said receiving element is in the form of a strengthening sleeve extending around the end portion of the pipe.

HENRY N. WEBSTER.

REFERENCES CITED

The following references are of record in the file of this patent:

UNITED STATES PATENTS

| Number | Name | Date |
| --- | --- | --- |
| 1,148,913 | McClellan | Aug. 3, 1915 |
| 2,184,881 | Martinet | Dec. 26, 1939 |
| 2,278,074 | Hauf | Mar. 31, 1942 |